United States Patent [19]
Larochelle et al.

[11] Patent Number: 5,184,872
[45] Date of Patent: Feb. 9, 1993

[54] DUMPING SEMI-TRAILER

[75] Inventors: Bernard Larochelle, Sillery; Robert Dupont, Québec, both of Canada

[73] Assignee: Phil Larochelle Equipments Inc., Quebec, Canada

[21] Appl. No.: 714,006

[22] Filed: Jun. 11, 1991

[30] Foreign Application Priority Data

Jun. 7, 1991 [CA] Canada ................................ 2044127

[51] Int. Cl.⁵ .............................................. B60P 1/16
[52] U.S. Cl. .............................. 298/22 AE; 414/483
[58] Field of Search ....................... 298/175, 22 AE; 414/476, 483, 484

[56] References Cited

U.S. PATENT DOCUMENTS

| | | | |
|---|---|---|---|
| 2,853,341 | 9/1958 | Morse | 298/22 AE X |
| 3,459,451 | 8/1969 | Hoy | 298/22 AE X |
| 4,216,996 | 8/1980 | Pitts | 298/175 |

FOREIGN PATENT DOCUMENTS 695573 10/1964 Canada.
841484 5/1970 Canada.

Primary Examiner—Michael S. Huppert
Assistant Examiner—Janice Krizek
Attorney, Agent, or Firm—McGlew and Tuttle

[57] ABSTRACT

A semi-trailer dump trailer having a very long dump body supported by a middle axle bearing wheels is described. The dump body bottom frame, the rear support frame member and the front beam member form an articulated quadrilateral support frame assembly that can be folded down on itself. Such a semi-trailer is capable of handling an increased capacity, both structurally and legally without exceeding the maximum axle load permitted.

13 Claims, 5 Drawing Sheets

DUMPING SEMI-TRAILER

BACKGROUND OF THE INVENTION a) Field of the Invention

The present invention relates to a dumping semi-trailer. The invention relates further to a dumping semi-trailer having a middle axle.

b) Brief Description of the Prior Art

Semi-trailer dump trucks are a known variety of dump trucks having the dump body provided on a semi-trailer frame. When the dump body is made very long, as is often the case in semi-trailer dump trucks, the tilt mechanism, usually a hydraulic cylinder, must be specially adapted to lift the long dump body through a great distance in order to dump the contents of the dump body.

Canadian Patent 695,573 describes using a single articulated arm to facilitate tilting of the dump body. The articulated arm is connected between a base of the hydraulic cylinder located at the front of the dump body and the central part of the bottom of the dump body. In this way, the cylinder can extend through a distance about forty percent less than in the case when the dump body is pivotally attached at the rear of the rigid base-frame.

The single articulated mechanism described in Canadian Patent 695,573 was improved by the addition of a second articulated arm member, as described in Canadian Patent 841,484. The second articulated arm member interconnects between the first articulated arm member and the rear base frame of the rear axles of the semi-trailer dump truck. The second articulated arm member acts to maintain the rear frame horizontal, thus helping to maintain both rear axles level and on the ground during the articulated lifting process.

The current versions of the semi-trailer dump mechanism described in Canadian Patent 841,484 work smoothly and efficiently for small, light loads. However, it is desirable to extend the length of the semi-trailer dump body and to increase the carrying capacity as this would lead to greater efficiency. Extending the length of the semi-trailer dump body, thereby increasing the maximum possible load to be carried by the dump body, cannot be due to the restrictions on maximum axle load capacities, as determined by the highway authorities. The present length of the semi-trailer dump bodies can also be extended without exceeding the maximum legal limit for the length of a semi-trailer body.

OBJECTS OF THE INVENTION

It is therefore an object of the present invention to provide a dumping semi-trailer capable of handling an increased load capacity. The object of the invention is to provide a dumping semi-trailer capable of handling an increased capacity, both structurally and legally, in that the maximum axle load is not exceeded while carrying an increased load.

SUMMARY OF THE INVENTION

Therefore, the present invention provides a dumping semi-trailer having a middle axle bearing wheels for the purpose of supporting an increased load while decreasing the average axle load, which will ensure that the maximum legal axle load limit is not exceeded. It is furthermore the object of this invention to provide a dumping semi-trailer that is able to support an increased load during transport.

According to the invention a dumping semi-trailer is provided for use with a tractor, the semi-trailer comprising: a dump body having a bottom frame with a front portion, a middle portion and a rear portion; a hitch member for engaging with a complementary turntable hitch member of the tractor; a front beam member pivotally interconnecting the hitch member to the middle portion of the bottom frame of the dump body; a hydraulic cylinder extending between and pivotally connected to both the hitch member and the front portion of the bottom frame of the dump body; a rear support frame member for supporting at least one axle bearing wheels, the rear support frame member being pivotally connected to the dump body at the rear portion of the bottom frame thereof and including an upper support surface for supporting the rear portion of the dump body; and a middle support frame member supporting a middle axle bearing wheels, the middle support frame member being pivotally interconnected between the rear support frame member and the front beam member, the middle support frame member including an upper support surface for supporting the bottom frame of the dump body. Therefore, according to the invention, the dump body bottom frame, the rear support frame member, the middle support frame member and the front beam member form an articulated quadrilateral support frame assembly that can be folded down on itself upon retraction of the hydraulic cylinder, such that part of a load carried by the dump body may be substantially uniformly distributed between at least one axle bearing wheels of the rear support frame member, the middle axle bearing wheels of the middle support frame member and along a front beam member up to the front hitch member.

Furthermore, the invention may preferably comprise locking means interacting between the dump body and the turntable hitch member for securing the dump body against lateral and longitudinal movement with respect the turntable hitch member. The locking means are engaged during transport and are disengaged during tilting of the dump body.

Figure 1:
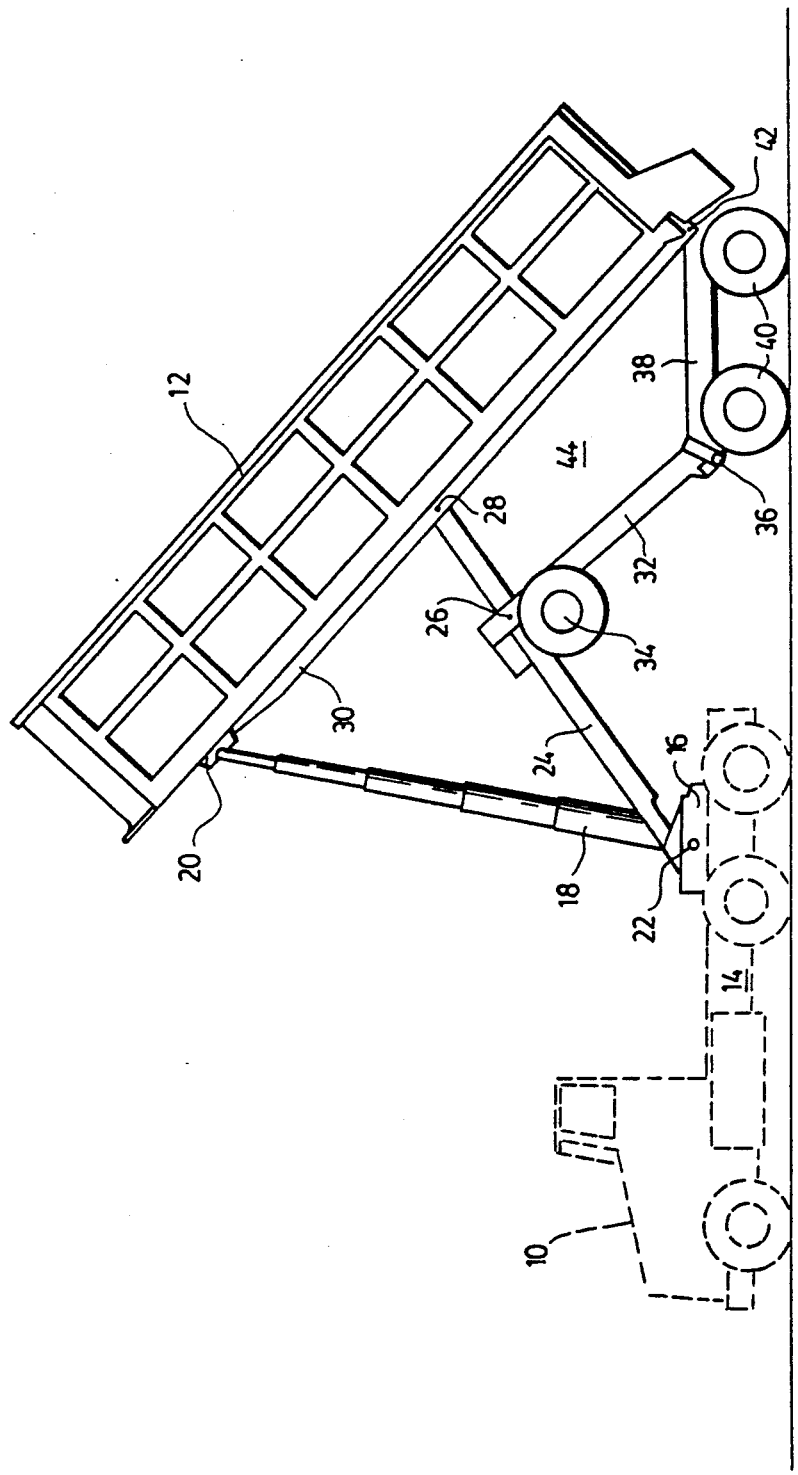
FIG. 1 is a side view of a dumping semi-trailer connected to a tractor, according to the preferred embodiment, with the dump body shown in the tilted position.

In general, the dumping semi-trailer, according to the invention, as shown in FIG. 1, comprises a dump body 12, rear axles and wheels 40, middle axle bearing wheels 34 and is pulled by turntable hitch 16, which is connected to tractor 10. The dump body is tilted under the action of a hydraulic cylinder 18 and the rear axles 40 are maintained level during tilting as a result of an articulated quadrilateral support frame 44. The middle axle bearing wheels 34 allows the dumping semi-trailer to handle a larger capacity without exceeding the maximum legal axle load. Locking means 20 connect the bottom of dump body 12 to turntable 16 so that the dump body 12 is secured against inertial forces during transport at the front of the dump body 12.

As shown in FIG. 1, the dump body 12 is pivotally attached at its rear to rear support frame member 38 via the pivot joint 42, the rear support frame member 38 being supported by a pair of rear axles bearing wheels 40. The dump body 12 is supported at its front part during tilting by hydraulic cylinder 18. The hydraulic cylinder 18 is a multi-stage hydraulic cylinder, which is pivotally interconnected between the dump body 12 and the turntable hitch 16. The turntable hitch 16 is supported by the frame 14 of the tractor 10. A front beam member 24 is connected between the pivot 22 of the turntable hitch 16 and a pivot 28 located near the middle of rails 30 provided on the bottom of the dump body 12. The middle support frame member 32 is pivotally interconnected between the rear support frame member 38 at pivot 36 and the front beam member 24 at pivot 26. The middle support frame member 32 is provided with the middle axle bearing wheels 34. The middle axle bearing wheels 34 is provided with a suspension system 55 (shown in FIG. 5), which is adjustable so that the middle axle bearing wheels 34 may be lifted from contact with the road surface when the load carried by the dump body 12 does not require the extra support of the middle axle bearing wheels 34. The members 30, 38, 32 and 24 are all pivotally interconnected to form the articulated quadrilateral support frame 44, which operates to maintain rear support frame member 38 level with respect to the road surface while the dump body 12 is tilted. In this way, the weight of the load of the dump body 12 is distributed between both rear axles bearing wheels 40 as well as tractor 10 without placing an imbalanced load on any one axle.

Figure 2:
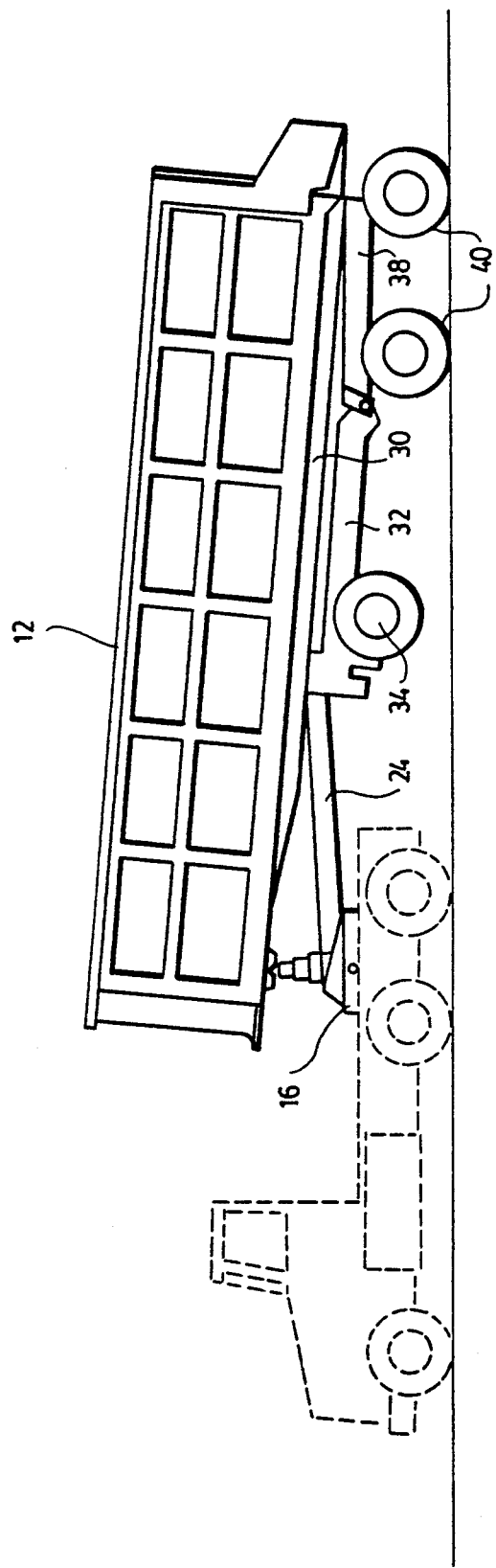
FIG. 2 is a side view of the preferred embodiment with the dump body in the intermediate position.
Figure 3:
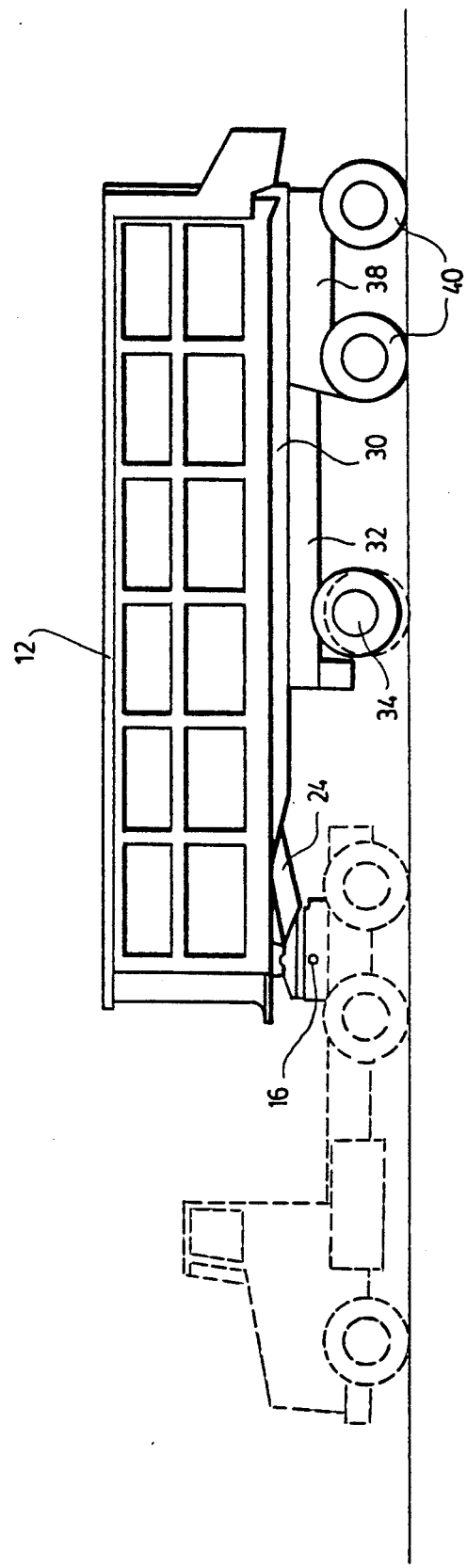
FIG. 3 shows a side view of the preferred embodiment with the dump body in the fully lowered position and ready for transport.

As best shown in FIGS. 2 and 3, the dump body 12 is lowered to rest on the support frame members 38, 32 and 24, such that the bottom rails 30 distribute the weight of the dump body 12 evenly over the frame members 38 and 32 while the front beam member 24 directly supports the dump body 12 and consequently evenly over the axles bearing wheels 34 and 40. When an increased load is to be transported, inertial forces during transport demand that special support be provided to the dump body 12. Such inertial forces exceed the simple gravitational forces; therefore, it is not sufficient that the dump body be supported by the rear and the front ends as is the case during tilting, as shown in FIG. 1. Consequently, rear and middle support frame members 38 and 32 support evenly the dump body 12 via rails 30 over about the rear two thirds of the dump body 12. The front beam member 24 supports the dump body 12 up to the turntable hitch member 16. At the front of the dump body 12, the turntable hitch 16 supports the dump body and is also aided by locking means 20, which engage with turntable hitch 16 to secure dump body 12 against inertial forces during transport.

Figure 4:
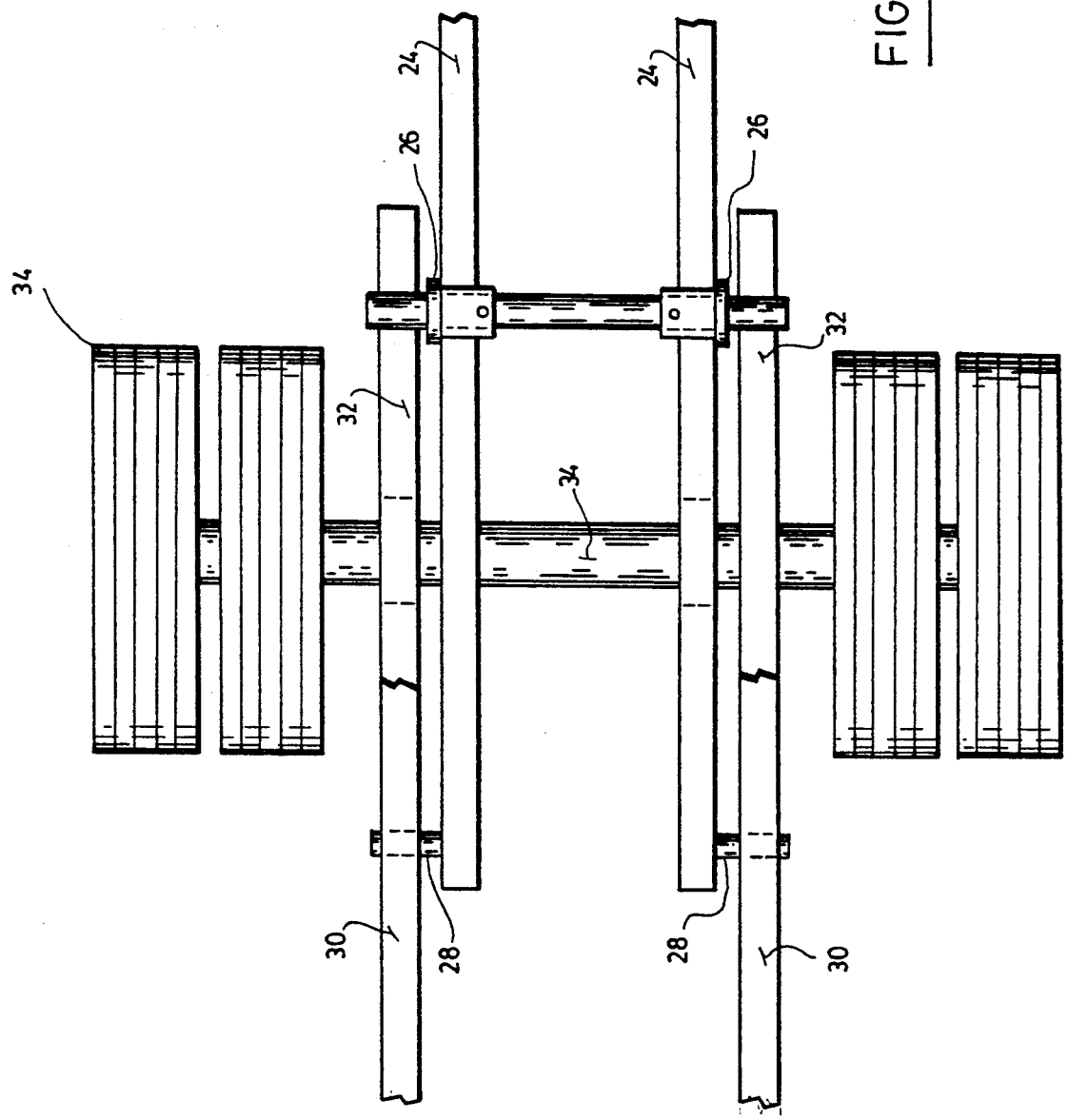
FIG. 4 shows a bottom view of a portion of the dumping semi-trailer of the preferred embodiment showing details of the middle axle area only.

As shown in FIG. 4, middle axle bearing wheels 34 supports a pair of tires on each side (suspension system 55 is omitted for clarity), and middle support frame member 32 comprises a pair of beams that support a pair of rails 30 provided on the bottom of dump body 12. The front beam member 24 comprises a pair of beam members that lie on the inside of rails 30 and support dump body 12 up to the turntable hitch 16. Pivot connection members 26 interconnect the two sides of the middle support frame member 32 to the outside of the front beam member 24. The articulated quadrilateral support frame 44 is formed so that when the longitudinal rails 30 are in the lowered horizontal position, they rest evenly on the upper surface of middle and rear support frame members 32 and 38 and the front portion of the dump body rests on the front beam member 24.

As can be seen from FIGS. 1 through 3, the invention provides for a larger spacing of axles 40 and 34, such that an increased load is evenly distributed over a greater distance and over an extra axle 34. The capacity of the dumping semi-trailer, according to the invention, can therefore be increased. Also, the provision of middle support frame member 32 coupled to supporting the front beam member 24 along with middle axle bearing wheels 34 allows the dump body 12 to be made longer without having to increase the strength of rails 30 supporting the dump body 12. During transport, the increased inertial forces, which arise due to the increased load, are supported at turntable hitch 16 by locking means 20.

Figure 5:
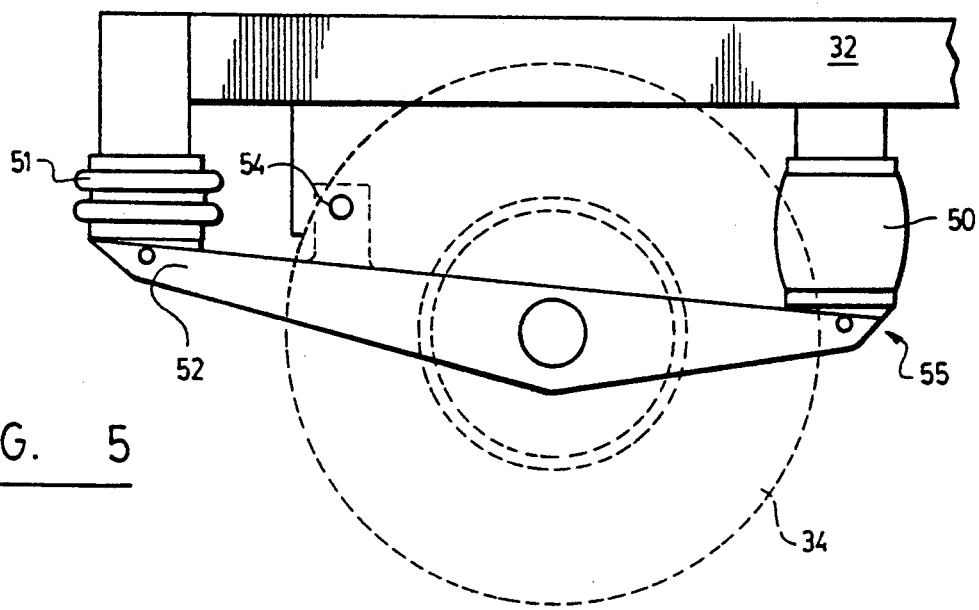
FIG. 5 is an enlarged partial side view of the middle axle area only.

FIG. 5 shows the suspension system 55 of middle axle bearing wheels 34. The system 55 has a lever beam 52 pivotally connected to frame member 32 at pivot 54 and lever beam 52 is supported at its ends by balloon cylinders 50 and 51. Beam 52 supports bearing of the axle 34 located rearwardly of pivot 54 such that beam 52 can raise and lower axle and wheels 34 by the action of cylinders 50 and 51. System 55 is provided on each one of the pair of beams 32.

Figure 6:
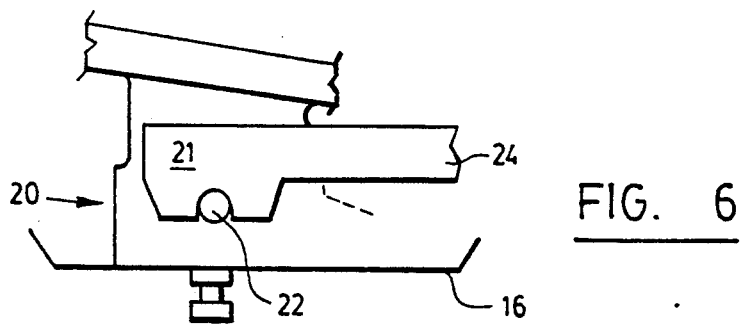
FIG. 6 is an enlarged partial side view of the semi-trailer hitch showing the locking means of the preferred embodiment.
Figure 7:
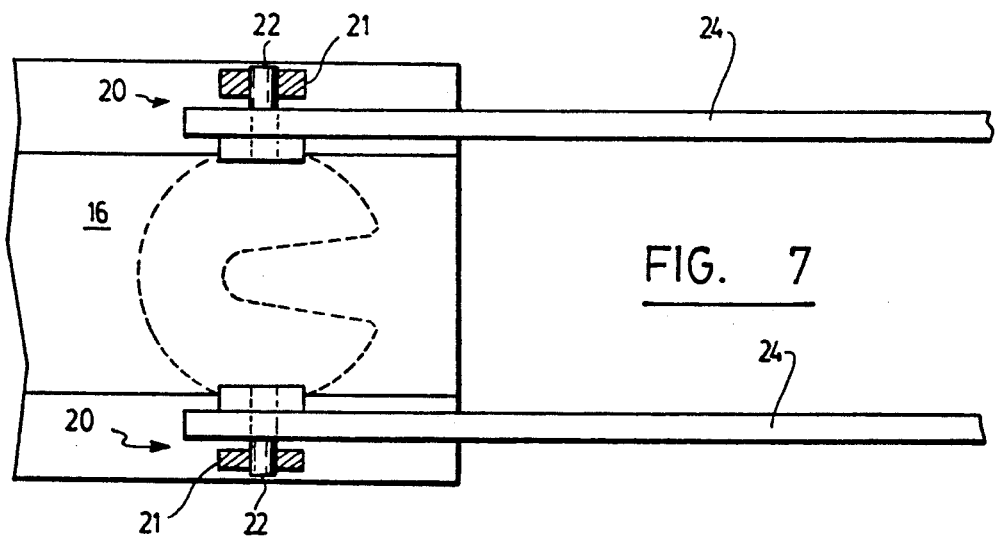
FIG. 7 is an enlarged partial top view of the semi-trailer hitch showing the locking means of the preferred embodiment.

FIGS. 6 and 7 illustrate the locking means 20 which consist of a pair of adaptors 21 fitting onto pivot pins 22 provided on hitch 16. Locking means 20 comprise the pair of adaptors 21 which are secured to the bottom of dump body 12. The front beam member 24 is further pivotally connected to the pivot pin 22.

Although the invention has been shown as having two axle bearing wheels 40 on rear support frame member 38 and a single axle bearing wheels 34 on middle support frame member 32, it is, of course, possible to provide the middle support frame member 32 with an additional axle bearing wheels 34 or even to provide rear support frame member 38 with a single axle bearing wheels 40.

Although the invention has been described above, with reference to the features of the preferred embodiment, it is to be understood that the above description is not intended to limit the scope of the present invention, as defined in the appended claims.

We claim:

1. A dumping semi-trailer for use with a tractor, the dumping semi-trailer comprising:
   a dump body having a bottom frame with a front portion, a middle portion and a rear portion;
   a hitch member for engaging with a complementary turntable hitch member of the tractor;
   a front beam member pivotally connected at a front end to the hitch member and at a rear end to the middle portion of the bottom frame of the dump body;
   a hydraulic cylinder extending between and pivotally connected to both the hitch member and the front portion of the bottom frame of the dump body;

a rear support frame member for supporting at least one axle bearing wheels, the rear support frame member being pivotally connected to the dump body at the rear portion of the bottom frame and including an upper support surface for supporting said rear portion of the dump body; and a middle support frame member supporting a middle axle bearing wheels, the middle support frame member having a rear end pivotally connected to a front of the rear support frame member and a front end pivotally connected to the front beam member, the middle support frame member including an upper support surface for supporting the middle portion of the bottom frame of the dump body, whereby, when the cylinder is retracted, the bottom frame rests on the middle and the rear support frame members, and when the cylinder is extended, the rear support frame member remains substantially horizontal, such that a part of a load carried by the dump body may be substantially uniformly distributed between the at least one axle bearing wheels of the rear support frame member, the middle axle bearing wheels of the middle support frame member, and the front hitch member.

2. The dumping semi-trailer as claimed in claim 1, wherein said bottom frame of the dump body comprises a pair of parallel longitudinal rails and the rear and the middle support frame members each comprise a pair of parallel longitudinal upper-support surfaces for engaging said rails.

3. The dumping semi-trailer as claimed in claim 2, wherein the front beam member comprises a pair of parallel beams pivotally connected to inside portions of said rails, said front beam member further supporting said front portion of the bottom frame.

4. The dumping semi-trailer as claimed in claim 3, wherein the middle support frame member is connected to an outside of said pair of parallel beams of the front beam member by two coaxial pivot joints.

5. The dumping semi-trailer as claimed in claim 1, further comprising locking means interacting between the dump body and the turntable hitch member for securing the dump body against lateral and longitudinal movement with respect to the turntable hitch member.

6. The dumping semi-trailer as claimed in claim 1, wherein the middle axle is supported by means of an adjustable suspension system.

7. The dumping semi-trailer as claimed in claim 2, wherein the middle axle is supported by means of an adjustable suspension system.

8. The dumping semi-trailer as claimed in claim 3, wherein the middle axle is supported by means of an adjustable suspension system.

9. The dumping semi-trailer as claimed in claim 4, wherein the middle axle is supported by means of an adjustable suspension system.

10. The dumping semi-trailer as claimed in claim 1, wherein the hydraulic cylinder is a multi-stage hydraulic cylinder.

11. A dumping semi-trailer for use with a tractor, the dumping semi-trailer comprising:

a dump body having a bottom frame with a front portion, a middle portion and a rear portion;

a hitch member for engaging with a complementary turntable hitch member of the tractor;

a front beam member pivotally connected at a front end to the hitch member and at a rear end to the middle portion of the bottom frame of the dump body;

a hydraulic cylinder extending between and pivotally connected to both the hitch member and the front portion of the bottom frame of the dump body;

a rear support frame member for supporting at least one axle bearing wheels, the rear support frame member being pivotally connected to the dump body at the rear portion of the bottom frame and including an upper support surface for supporting said rear portion of the dump body; and a middle support frame member supporting a middle axle bearing wheels, the middle support frame member having a rear end pivotally connected to a front of the rear support frame member and a front end pivotally connected to the front beam member, the middle support frame member including an upper support surface for supporting the middle portion of the bottom frame of the dump body, wherein the bottom frame of the dump body, the rear support frame member, the middle support frame member and the body supporting front beam member form an articulated quadrilateral support assembly such that a part of a load carried by the dump body may be substantially uniformly distributed between the at least one axle bearing wheels of the rear support frame member, the middle axle bearing wheels of the middle support frame member, and the front hitch member, said bottom frame of the dump body includes a pair of parallel longitudinal rails and the rear and the middle support frame members each include a pair of parallel longitudinal upper-support surfaces for engaging said rails.

12. The dumping semi-trailer as claimed in claim 11, wherein the front beam member includes a pair of parallel beams pivotally connected to inside portions of said rails, said front beam member further supporting said front portion of the bottom frame.

13. The dumping semi-trailer as claimed in claim 12, wherein the middle support frame member is connected to the front beam member by two coaxial pivot joints, each of which is located between the front beam member and said rails.

* * * * *